United States Patent
Peacock et al.

(10) Patent No.: US 9,846,703 B2
(45) Date of Patent: Dec. 19, 2017

(54) PAGE-BASED METADATA SYSTEM FOR DISTRIBUTED FILESYSTEM

(71) Applicant: Vivint, Inc., Provo, UT (US)

(72) Inventors: Alen Lynn Peacock, Orem, UT (US); Erik Sean Nolte, Salt Lake City, UT (US); John Timothy Olds, Sandy, UT (US); Jeffrey Michael Wendling, West Jordan, UT (US)

(73) Assignee: Vivint, Inc., Provo, UT (US)

( * ) Notice: Subject to any disclaimer, the term of this patent is extended or adjusted under 35 U.S.C. 154(b) by 267 days.

(21) Appl. No.: 14/503,063

(22) Filed: Sep. 30, 2014

(65) Prior Publication Data

US 2016/0092593 A1 Mar. 31, 2016

(51) Int. Cl.
*G06F 7/00* (2006.01)
*G06F 17/30* (2006.01)

(52) U.S. Cl.
CPC .............. *G06F 17/30194* (2013.01)

(58) Field of Classification Search
CPC ......... G06F 17/30914; G06F 17/30312; G06F 17/301; G06F 17/30722; G06F 17/30997; G06F 2211/104
USPC .................. 707/697, 698, 796, 800
See application file for complete search history.

(56) References Cited

U.S. PATENT DOCUMENTS

| | | | |
|---|---|---|---|
| 6,665,659 B1 * | 12/2003 | Logan | G06F 17/30864 |
| 7,769,711 B2 | 8/2010 | Srinivasan et al. | |
| 8,276,065 B2 * | 9/2012 | Huang | G06F 17/30722 |
| | | | 715/234 |
| 8,301,673 B2 | 10/2012 | Hyer, Jr. et al. | |
| 8,612,382 B1 | 12/2013 | Patel et al. | |
| 8,856,051 B1 * | 10/2014 | Song | G06N 99/005 |
| | | | 706/12 |
| 9,280,591 B1 * | 3/2016 | Kharatishvili | G06F 17/30575 |
| 9,294,558 B1 * | 3/2016 | Vincent | H04L 67/1006 |
| 2005/0149472 A1 * | 7/2005 | Schreter, IV | G06F 17/30324 |
| 2006/0149782 A1 * | 7/2006 | Yeh | G06F 8/20 |
| 2009/0030952 A1 * | 1/2009 | Donahue | G06F 17/30566 |
| 2010/0306187 A1 * | 12/2010 | Arrouye | G06F 17/301 |
| | | | 707/711 |
| 2010/0325181 A1 * | 12/2010 | Skillcorn | G06F 17/30091 |
| | | | 707/829 |
| 2011/0016085 A1 | 1/2011 | Kuo et al. | |
| 2011/0289049 A1 * | 11/2011 | Zeng | G06F 17/30997 |
| | | | 707/611 |
| 2012/0109957 A1 * | 5/2012 | Vandervort | G06F 17/227 |
| | | | 707/737 |
| 2013/0318095 A1 * | 11/2013 | Harold | G06F 17/30424 |
| | | | 707/741 |
| 2013/0339406 A1 * | 12/2013 | Kanfi | G06F 17/30082 |
| | | | 707/825 |

(Continued)

*Primary Examiner* — Mohammed R Uddin
(74) *Attorney, Agent, or Firm* — Holland & Hart LLP

(57) ABSTRACT

Methods and systems are described for storing metadata in a network of distributed remote storage devices. An example computer implemented method includes identifying a plurality of metadata inodes, grouping the plurality of metadata inodes into one or more metadata pages, mapping the plurality of metadata inodes and the plurality of metadata pages, and storing the mapping as a manifest page, and storing data to and retrieving data from the distributed remote storage devices using the plurality of metadata inodes.

20 Claims, 10 Drawing Sheets

(56) References Cited

U.S. PATENT DOCUMENTS

| | | | |
|---|---|---|---|
| 2014/0059284 A1* | 2/2014 | Fang | G06F 12/02 |
| | | | 711/104 |
| 2014/0095556 A1* | 4/2014 | Lee | G06F 17/30091 |
| | | | 707/824 |
| 2014/0122491 A1* | 5/2014 | Pennefather | G06F 21/645 |
| | | | 707/737 |
| 2015/0261600 A1* | 9/2015 | Iturralde | G06F 11/08 |
| | | | 714/747 |
| 2015/0277802 A1* | 10/2015 | Oikarinen | G06F 3/0631 |
| | | | 711/114 |

* cited by examiner

PAGE-BASED METADATA SYSTEM FOR DISTRIBUTED FILESYSTEM

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers has come an increased presence of in-home computing capability. As the prevalence and complexity of home computing systems and devices expand to encompass other systems and functionality in the home, opportunities exist for improved communications between and monitoring of devices distributed across many homes, such as devices in peer-to-peer networks.

SUMMARY

Methods and systems are described for storing metadata in a network of distributed remote storage devices. An example computer implemented method includes identifying a plurality of metadata inodes, grouping the plurality of metadata inodes into one or more metadata pages, mapping the plurality of metadata inodes and the plurality of metadata pages, storing the mapping as a manifest page, and storing data to and retrieving data from the distributed remote storage devices using the plurality of metadata inodes.

In one example, retrieving data from the distributed remote storage devices includes referencing the manifest page for a location of at least one of the metadata inodes, and then accessing the at least one of the metadata inodes based on the location. The metadata inodes may include at least one of a directory inode, a file inode, and a symlink inode. The plurality of metadata inodes may include inode identifiers, and the one or more metadata pages may include page identifiers, wherein the inode identifiers and page identifiers are used for the mapping. The method may include creating additional metadata pages when distributed remote storage devices are added to the network. The method may include revising or removing one or more of the metadata pages when at least one of the distributed remote storage devices is removed from the network. The method may include storing the metadata pages and the manifest page in a filesystem for the network. Grouping the plurality of metadata inodes may be based on at least one criteria. The at least one criteria may include a type of metadata inode.

Another embodiment is directed to a computer-program product for storing metadata in a network of distributed remote storage devices. The computer-program product includes a non-transitory computer-readable medium storing instructions executable by a processor to group a plurality of metadata inodes into at least one metadata page, map the plurality of metadata inodes, store the map as a manifest page, store the at least one metadata page and the manifest page in a filesystem for the network, and retrieve data from the distributed remote storage devices using the plurality of metadata inodes.

The instructions may be executable by the processor to receive additional metadata inodes for at least one additional distributed remote storage device added to the network, and add the additional metadata inodes to one of the at least one metadata page or create at least one additional metadata page for the additional metadata inodes. The instructions may be executable by the processor to add data to the distributed remote storage devices using the plurality of additional metadata inodes. The instructions may be executable by the processor to update the manifest page to include mapping of the additional metadata inodes. The instructions may be executable by the processor to store multiple copies of the metadata inodes in the filesystem. The instructions may be executable by the processor to assign a metadata inode identifier to each metadata inode, and assign a metadata page identifier to each metadata page, wherein retrieving data includes using the metadata inode identifier and the metadata page identifier to locate the data.

A further embodiment is directed to an apparatus for storing metadata in a network of distributed remote storage devices. The apparatus includes a processor, a memory in electronic communication with the processor, and instructions stored in the memory. The instructions are executable by the processor to identify a plurality of metadata inodes, group the plurality of metadata inodes into at least one metadata page, map the plurality of metadata inodes and the plurality of metadata pages, store the map as a manifest page, and at least one of store data to and retrieve data from the distributed remote storage devices using the plurality of metadata inodes.

In one example, the instructions may be executable by the processor to store the at least one metadata page and the manifest page in a filesystem for the network. The instructions may be executable by the processor to divide the manifest page into a plurality of manifest pages. The instructions may be executable by the processor to assign a page identifier to each metadata page and assign a metadata identifier to each metadata inode. The metadata may include at least one structure data with information about other inode objects, names of the inode objects, and cryptographic information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
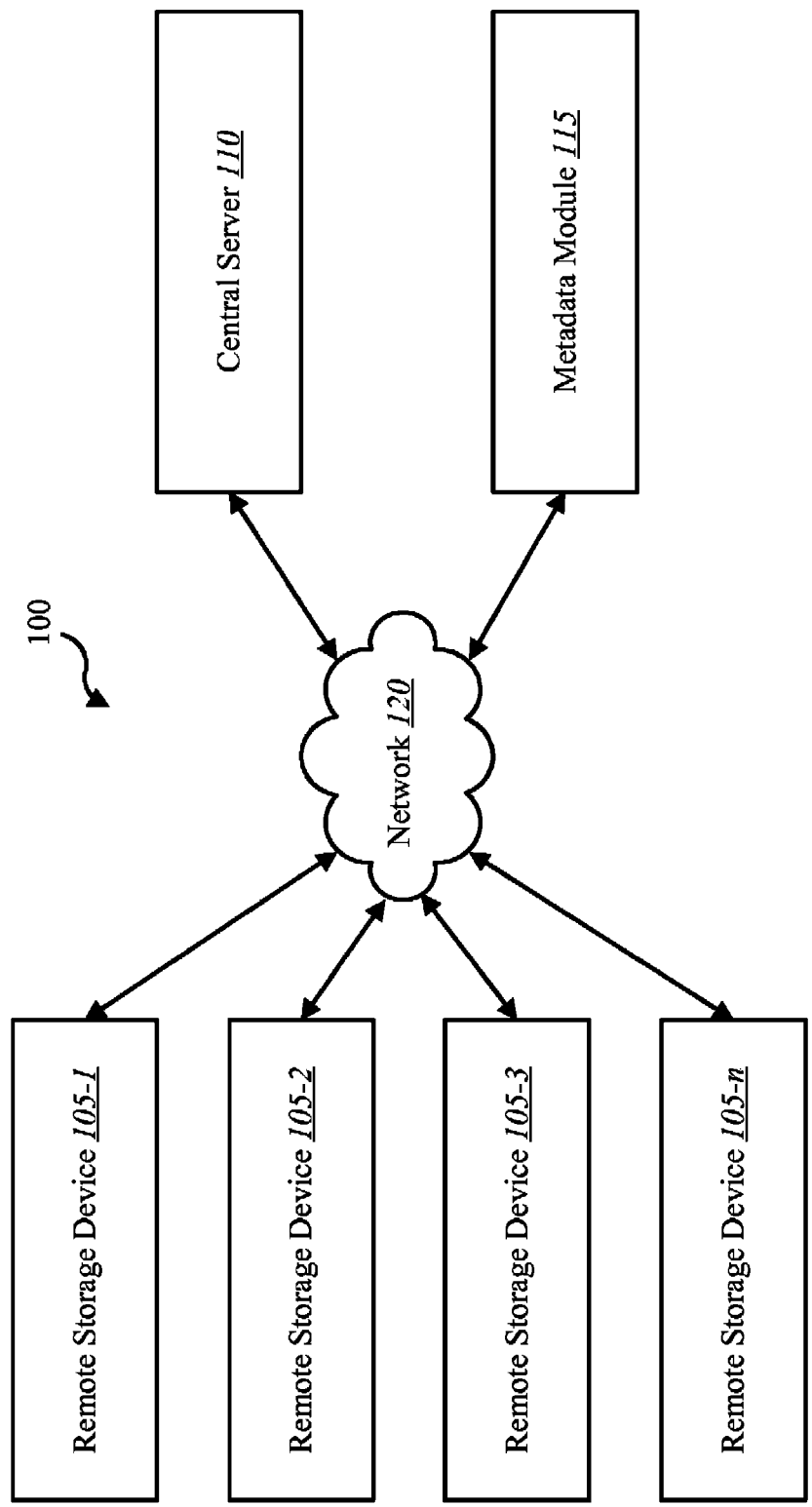
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein generally relate to storing metadata in a network of distributed remote storage devices. Distributed filesystems generally need to maintain some of the same types of metadata about files as local filesystems such as filesystem object names, modes, etc., but also other metadata that is specific to distributed filesystems. The distributed filesystem metadata includes block locations in the distributed system where data resides, and metadata about those blocks such as their object names and perhaps cryptographic information such as encryption/decryption keys for the blocks or cryptographic hashes of the block data for data integrity checks.

One approach for keeping track of the metadata is to keep all of the metadata in a monolithic store. An on-disk database, a file, or a set of files, a set of on-disk databases, or any scheme in which metadata for all the files is kept in one system fall under this category. At the other end of the spectrum, a single record with the metadata for a single file can be stored separately in the system, as a distinct atom of information. The former approach keeps the design simple, at the expense of having an ever growing single store of metadata to maintain over time. Scanning or walking an entire filesystem is efficient with this approach, as finding any object in the system requires only one lookup. However, this comes at the cost of additional expense during update of records during normal operation. The latter approach is efficient at updating records during normal operation, but much more expensive for scanning or walking the entire filesystem, as each file object requires a separate operation to complete.

Most distributed systems choose between storing one distributed object per filesystem metadata object (a pure inode based system) or maintaining all filesystem metadata in a single data structure (a pure manifest based system). Both of these approaches have advantages and disadvantages, and there are actually solutions between these two extremes. The present disclosure involves a compromise between the two extremes in which individual metadata records for filesystem objects are not each stored separately, but are not stored monolithically either. Instead, groups of filesystem metadata are 'paged' together and stored together. This structure makes update operations less onerous than the monolithic approach, and makes scanning/walking efficient as well. This structure also forms a useful compromise for performance of the system.

A filesystem in which the present disclosure operates is made up of inodes and blocks. Inodes are structured data (i.e., metadata) that contain information about other inodes or blocks. Blocks simply contain chunks of file data. Logically, every filesystem has a root inode which contains pointers to files and directories within that inode. Each of those inodes can similarly have pointers to other inodes and blocks, such that the filesystem can be thought of as a directed graph with a path from the root inode to every object in the filesystem. Each inode has a specific filesystem type. Currently there are three such choices: "DIR", "FILE", and "SYMLINK." All types of inodes share a metadata section that includes typical filesystem metadata, such as mode, mtime, ctime, etc. A directory inode (DIR) contains a list of name and pointer pairs to other inodes called directory entries. A file inode (FILE) contains a list of sizes and pointers to blocks. A symlink inode (SYMLINK) simply has an encrypted string value in its metadata that contains an opaque path.

One option for storing inodes would be to store each one separately. Since inodes need to be globally addressable, being able to lookup an inode given its key is essential. In distributed systems, the goal is to not rely on single points of failure (SPOFs). Additionally, in distributed system in which the present disclosure operates (i.e., a network of distributed remote storage devices), an object is to rely on centralized datacenter resources as little as possible. So one option would be to use some sort of distributed key value store that runs on all participants in the network. However, purely distributed key value stores have a latency cost, so storing each inode separately means that traversing the directed, hierarchical filesystem tree has a cost that multiplies with inode depth (e.g., files deep in directories have a much higher lookup cost than those stored near the root).

In order to reduce this cost, inode objects according to the present disclosure are aggregated into pages. Each page typically includes multiple inodes, and the page is stored as a single unit in the system, with a globally addressable page I.D. In order to locate an inode, the inode I.D. and the age I.D. are needed. Mapping from object key to page key is referred to as a manifest. The manifest may be a mapping from object I.D.'s to page I.D.'s (i.e., with offset into the page). The manifest is normally represented as a single page in the system, but if it grows larger than the size of a page, it is split into smaller segments which are then stored as a B-tree in the system.

FIG. 1 is a block diagram illustrating one embodiment of environment 100 in which the present systems and methods may be implemented. In at least some embodiments, environment 100 includes a plurality of remote storage devices 105, a central server 110, a metadata module 115, and a network 120. The network 120 facilitates communication between the remote storage devices 105 and between the remote storage devices 105, the central server 110, and the metadata module 115. Although metadata module 115 is shown as a separate component from the remote storage devices 105 and central server 110, other embodiments, such as those described below with reference to FIGS. 2-4, may include the metadata module 115 as part of at least one of the remote storage devices 105 and/or central server 110.

Environment 100 may include a plurality of remote storage devices 105. Remote storage devices 105 may be distributed remotely such as in a plurality of homes. Remote storage devices 105 may be located and/or distributed throughout a geographic area such as a country or continent. In some embodiments, remote storage devices 105 may be distributed globally. The remote storage devices 105 may be operable to store data, such as a plurality of data files. In some embodiments, each remote storage device 105 includes memory that is partitioned with one portioned being reserved for storing data received from other remote storage devices 105 (e.g., redundant or backup data storage), while other portions of the memory are dedicated to storing data from local sources (e.g., data generated by the users in the home or business where the remote storage device 105 is located). Remote storage devices 105 may be part of a network of remote storage devices having thousands, hundreds of thousands, or millions of units or nodes.

The filesystem for a network of remote storage devices 105 typically include two parts: file data that is stored in some way, such as in chunk or blocks, and metadata that describes or provides information about those blocks of data and/or information about other metadata. Metadata may include, for example, a file name, a location where a file is stored (e.g., a path), attributes about a file such as permissions, user permissions, ownership, or capabilities of a file within a system, time stamps (e.g., when file data was last accessed or moved, written to or erased), and other less assessable information such as metadata representing where or how to reconstruct the data blocks, where the data blocks are located on a hard drive or other memory, how to reassemble the data blocks into a continuous stream of bytes or bits that make up the file, and the like. The metadata may represent alternate data streams, or other data about how to track and/or reconstruct data files. When dealing with a distributed filesystem such as the one associated with the present disclosure, the metadata typically should be accessible globally. As such, there is a need for a global address space for the metadata so that all users of the filesystem can converge on the same data when they are looking up file data. The metadata (e.g., inodes) may represent directories, files, and the like, and the metadata provides a path for accessing data files and being able to reconstruct the files.

As mentioned above, in a distributed filesystem, such as one including a plurality of remote storage devices 105 as described herein, the metadata lookups may be expensive (e.g., time consuming and demanding large amounts of resources). The page-based metadata system according to the present disclosure addresses these and other challenges associated with the need to provide globally accessible metadata in a distributed network and/or filesystem. The metadata module 115 may operate at least in part to provide functionality for the page-based metadata system disclosed herein.

In one example, metadata is generated in the form of, for example, an inode related to, for example, a location or name of a data block. A location may include an actual IP address for the data block. The inode may receive a metadata identifier. Metadata module 115 may group together a plurality of inodes into a page of inodes (also referred to as a page of inodes). The page of inodes may also be given an identifier (e.g., a page identifier). Metadata module 115 may operate to map the inode identifiers to a particular page, as well as a stored location for the page using the page identifier. This mapping of identifiers may be stored as a separate page known as a manifest or manifest page.

In some embodiments, metadata module 115 may operate to create a plurality of metadata pages, wherein identifiers associated with metadata inodes and metadata pages are stored within the metadata manifest and/or manifest page. A lookup function for any one of the metadata inodes may include referencing the manifest page, obtaining information about the metadata pages and/or metadata inodes based on the identifiers, and conducting a search by first obtaining the metadata page followed by obtaining the metadata inode. In some embodiments, the manifest page may be sufficiently long and/or of a size that necessitates dividing the manifest page into a plurality of pages.

The metadata pages and manifest page(s) may be stored at any location. For example, the metadata pages and/or manifest page may be stored on any one or more of the remote storage devices 105. Additionally, or alternatively, the metadata pages and/or manifest page may be stored on central server 110 or other location in the distributed filesystem (e.g., see FIGS. 3-4).

The grouping together of metadata inodes may be based at least in part on certain criteria. Metadata module 115 may apply the criteria as part of grouping together metadata inodes. The criteria may include, for example, files that are predicted to be accessed together as a group, files that have been accessed within a small time window in the past, files that belong to a common directory, directories that are accessed together or may be accessed together, or other criteria that optimizes access to the paged metadata.

One application for the page-based metadata system disclosed herein may be for one or more home automation and security systems (also referred to herein as home automation systems). Remote storage device 105 may be part of the home automation system. In some examples, remote storage devices 105 may be used to store data associated with one or more home automation systems, wherein each home automation system is associated with a particular home, business, property, or the like. Remote storage device 105 may be included in or comprise a control panel of the home automation system, or may be in communication with the control panel for the purpose of, for example, providing backup data storage for the home automation system. Central server 110 may be a backend server, such as a central server, central station, backend support system, or the like, for the home automation system.

Network 120 may utilize any available communication technology such as, for example, Bluetooth, Zigby, Z-wave, infrared (IR), radio frequency (RF), near field communication (NFC), or other short distance communication technologies. In other examples, network 120 may include cloud networks, local area networks (LAN), wide area networks (WAN), virtual private networks (VPN), wireless networks (using 802.11 for example), and/or cellular networks (e.g., using 3G and/or LTE), etc. In some embodiments, network 120 may include the internet.

Figure 2:
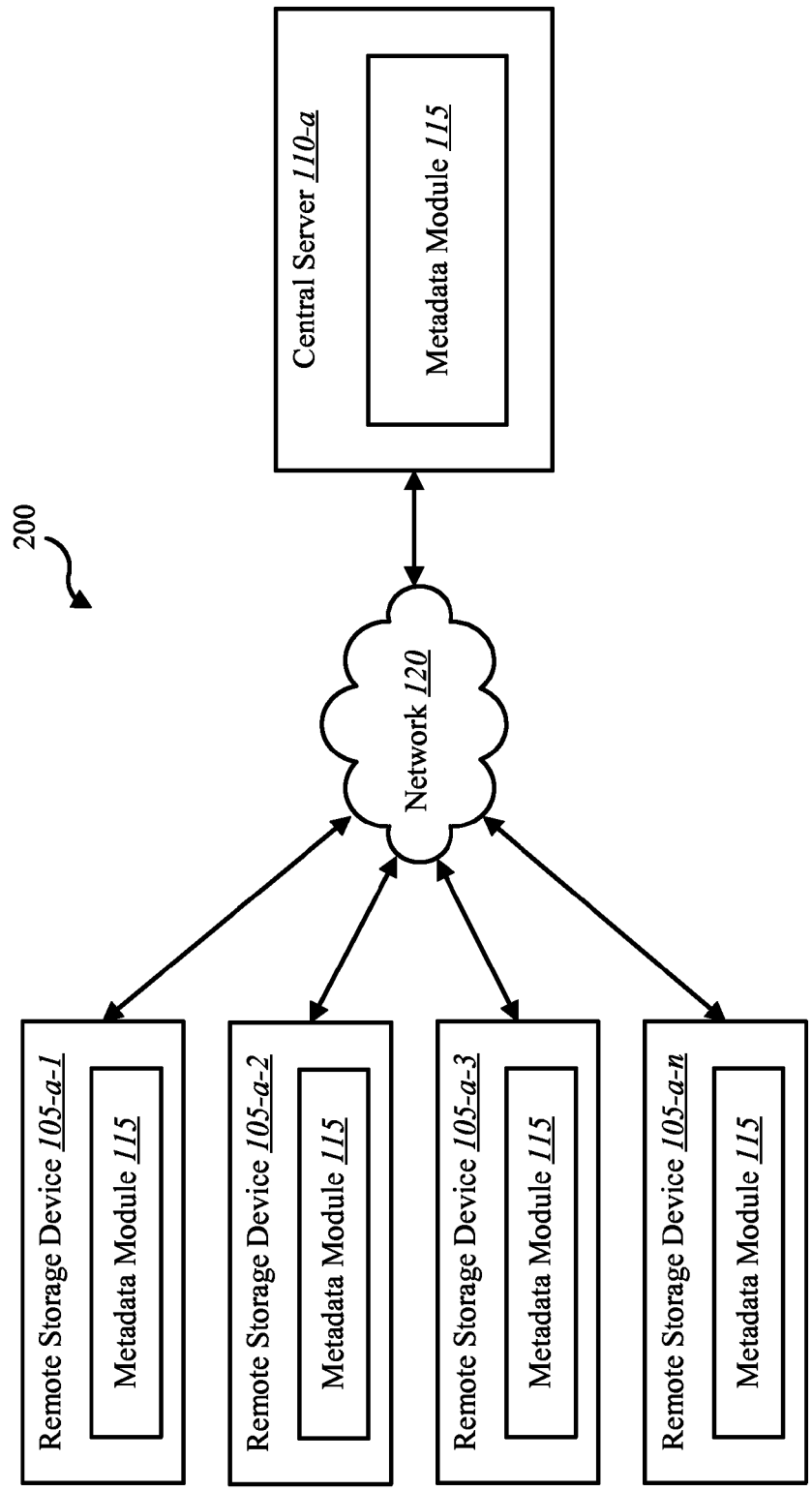
FIG. 2 is a block diagram of another environment in which the present systems and methods may be implemented.

FIG. 2 is a block diagram illustrating one example of an embodiment 200 in which the present systems may be implemented. Environment 200 may include at least some of the components of environment 100 described above. Environment 200 may include a plurality of remote storage devices 105-a each including a metadata module 115 or a component thereof. Environment 200 may also include a metadata module 115, or a component thereof, as part of a central server 110-a.

The operation of metadata module 115, or portions thereof, may include identifying, receiving, and/or creating metadata (e.g., metadata inodes). In some embodiments, the collecting, receiving and/or creating of metadata may occur at least in part at the remote storage devices 105-a. Metadata module 115 may operate to group together or collect the metadata (e.g., metadata inodes) as metadata pages and/or store the metadata as metadata pages. This grouping and/or storing of the metadata as metadata pages may occur at least in part on the remote storage devices 105-a.

Metadata module 115 may operate to map the metadata and metadata pages. The mapping may be configured or stored as a manifest and/or manifest page. The mapping and/or creation of a manifest page may occur on remote storage devices 105-a. Metadata module 115 may also operate to update the manifest and/or any of the metadata pages based on, for example, remote storage devices 105-a being added to or being taken away from the distributed network. The updating function may be performed at least in part on any one of the remote storage devices 105-a. Metadata module 115 may also operate to retrieve metadata and/or file data by referencing the manifest followed by accessing one or more of the metadata pages, and ultimately retrieve the metadata and/or file data based on the metadata that is retrieved. In at least some examples, metadata module 115 may also operate to store file data and/or metadata using the metadata pages and/or the manifest. Any of the steps described herein wherein metadata module 115 may operate at least in part on one or more of remote storage devices 105-a may occur, additionally or alternatively, at least in part on central server 110-a.

Figure 3:
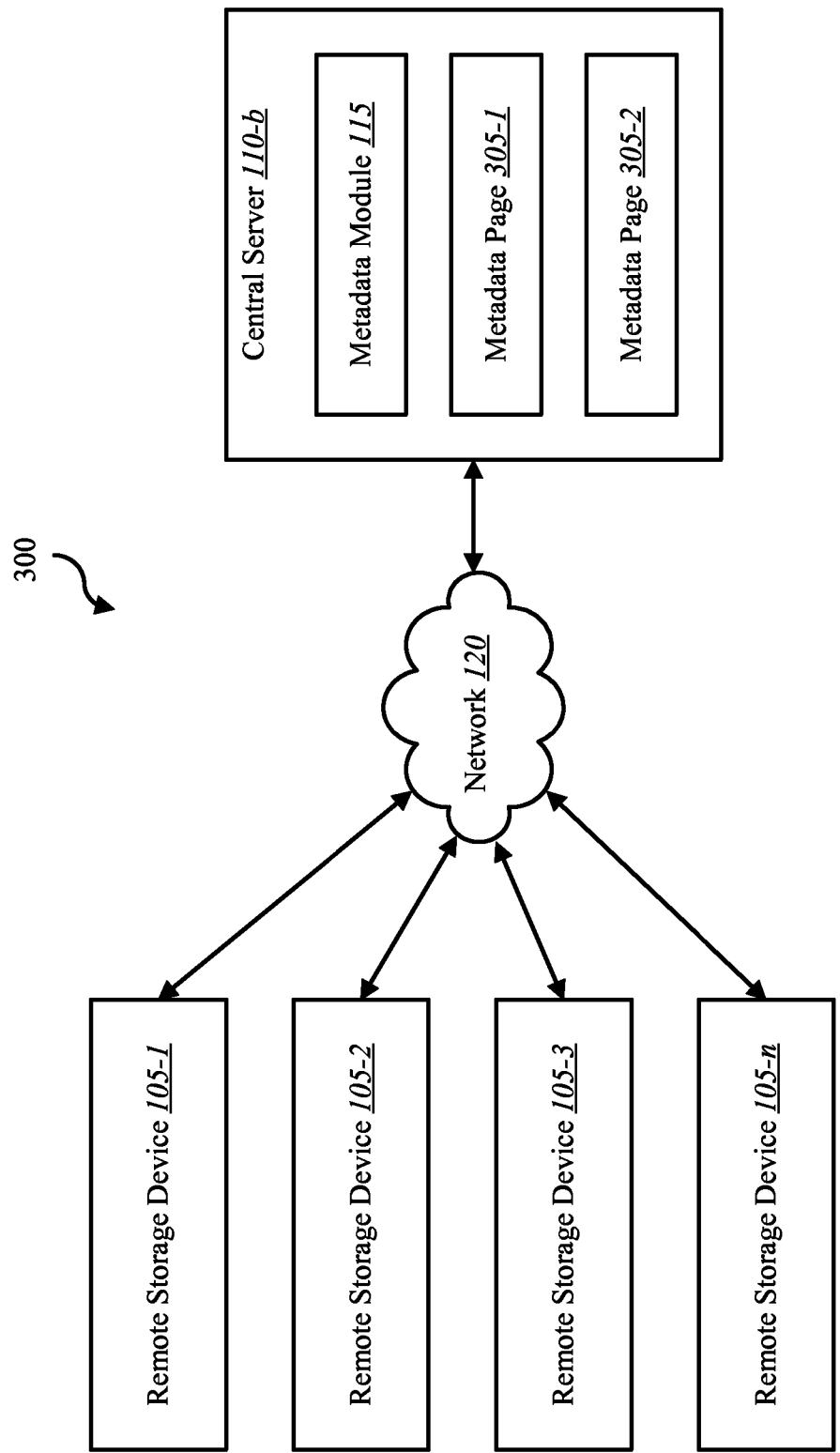
FIG. 3 is a block diagram of another environment in which the present systems and methods may be implemented.

FIG. 3 is a block diagram illustrating one embodiment of an environment 300 in which the present systems and methods may be implemented. Environment 300 may include at least some of the components of environments 100, 200 described above. Environment 300 may include a plurality of remote storage devices 105, a central server 110-b that includes metadata module 115 and metadata pages 305, and a network 120 that provides communication between remote storage device 105 and central server 110-a and/or metadata module 115 and metadata pages 305.

Environment 300 shows an embodiment in which metadata module and at least some of the metadata pages are stored and/or operable at least in part on central server 110-b. Remote storage devices 105 may communicate with central server 110-b and/or metadata module 115 to obtain metadata stored on any one of metadata pages 305. In some embodiments, metadata module 115 may transmit information to remote storage devices 105 such as, for example, any requested metadata that is stored on metadata pages 305. Remote storage devices 105 may communicate with central server 110-b upon being added to or removed from the network. Metadata module 115 may operate to update the metadata pages 305 based on a status of any one of remote storage devices 105, or a change in status.

In at least some embodiments, metadata module 115 may be operable at least in part without the use of a separate manifest page. In some arrangements, metadata module 115 may include a manifest or functionality of a manifest page as described above. In some embodiments, the manifest page may be stored and/or operable from a separate location from central server 110-b such as, for example, on one or more remote storage devices 105, a backend support system, or the like.

While two metadata pages 305 are shown in FIG. 3, other embodiments are possible that include a plurality of metadata pages 305 (e.g., tens, hundreds or thousands of pages). The metadata pages may be categorized based on certain criteria such as, for example, a type of data file, a type of metadata, a geographic location for a remote storage device to which the metadata relates, a time at which the metadata is generated, updated, or the like, or other criteria. The metadata pages 305 (e.g., all metadata pages of a certain category) may be stored in a common location.

Figure 4:
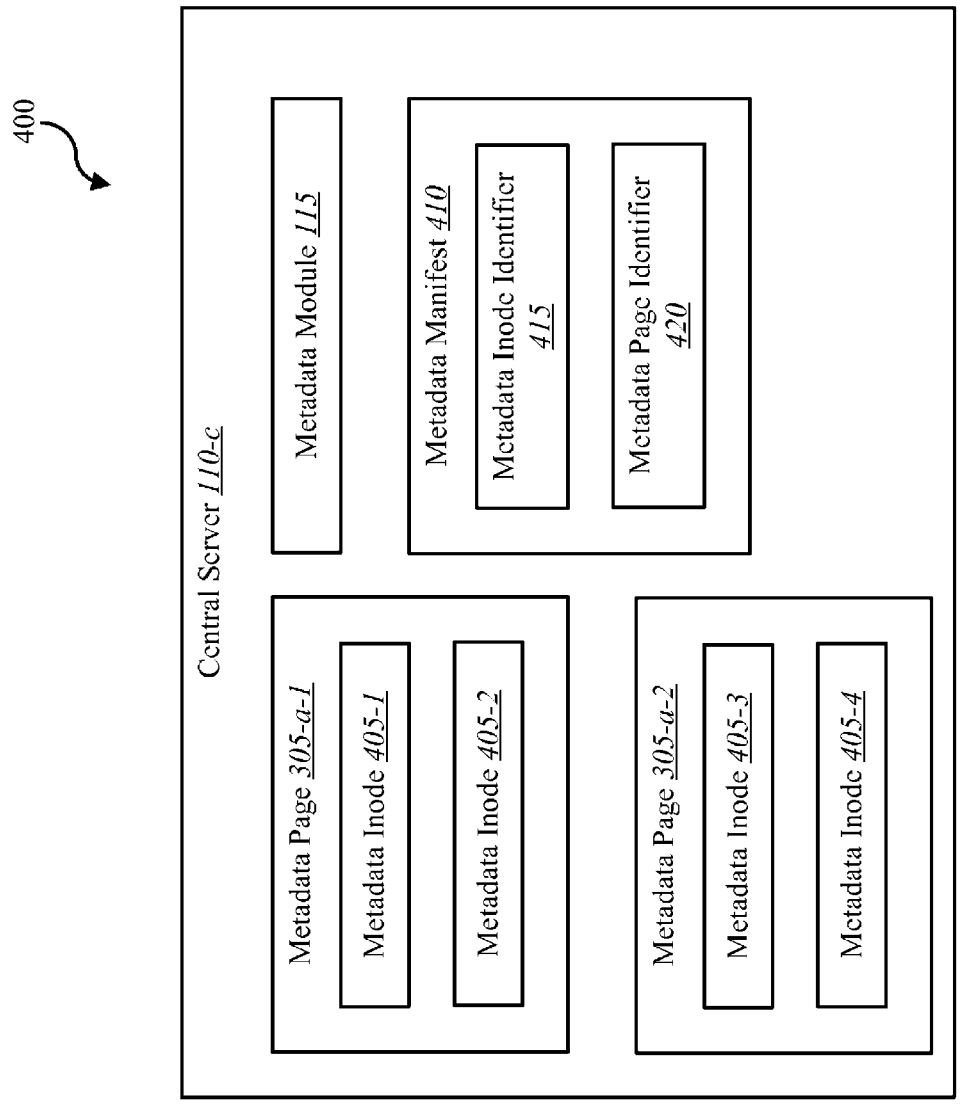
FIG. 4 is a block diagram of another environment in which the present systems and methods may be implemented.

FIG. 4 is a block diagram illustrating one embodiment of an environment 400 in which the present system and methods may be implemented. Environment 400 may include at least some of the of the components of environments 100, 200, 300 described above. Environment 400 includes a central server 110-c that includes metadata module 115, or components thereof, a plurality of metadata pages 305-a, and a metadata manifest 410. The metadata pages 305-a include a plurality of metadata inodes 405.

Each of the metadata pages 305-a may include one or more metadata inodes 405. In some embodiments, each metadata page 305-a includes a plurality of metadata inodes 405. The metadata pages 305-a and each of the metadata inodes 405 may include an identifier (e.g., a metadata page identifier 420 and a metadata inode identifier 415, respectively). The identifiers 415, 420 may be part of metadata manifest 410 (also referred to as a manifest page 410). While a pair of metadata pages 305-a are shown in FIG. 4, other embodiments may include a single metadata page or three or more metadata pages. Similarly, while a single metadata manifest 410 is shown in FIG. 4, other embodiments may include a plurality of metadata manifests 410.

The embodiment shown in FIG. 4 is merely exemplary of how the metadata pages and metadata manifest may be organized and/or saved on a central server 110-c. Other embodiments are possible in which the metadata pages 305-a and/or metadata manifests 410 are stored at least in part at other locations, such as, for example, on one or more of the remote storage devices 105. Metadata module 115, as described above, may be operable at least in part at other locations such as, for example, on any one of the remote storage devices 105, central server 110-C, or other devices or systems. The metadata pages 305-a, metadata inodes 405, metadata manifests 410, metadata inode identifier 415 and metadata page identifier 420 may be grouped, stored, distributed, created, searchable and the like in any desired manner such as for the purpose of creating optimization, efficiencies and enhanced performance for a distributed filesystem.

Figure 5:
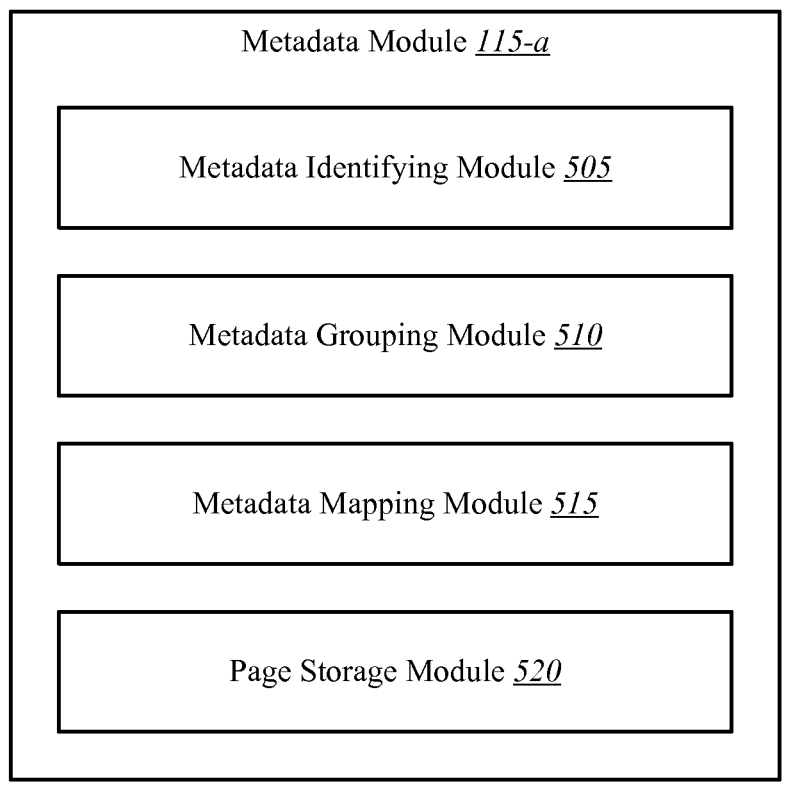
FIG. 5 is a block diagram of a metadata module of at least one of the environments shown in FIGS. 1-4.

FIG. 5 is a block diagram illustrating an example metadata module 115-a. Metadata module 115-a may be one example of the metadata module 115 described above with reference to FIGS. 1-4. Metadata module 115-a may include a metadata identifying module 505, a metadata grouping module 510, a metadata mapping module 515, and a page storage module 520. In other examples, metadata module 115-*a* may include more or fewer modules than those shown in FIG. 5.

Metadata identifying module 505 may operate primarily to identify metadata in a distributed filesystem. The metadata may be preexisting metadata. As discussed above, the metadata may include various types of information related to, for example, data files and/or other metadata. In some arrangements, the metadata may relate to remote storage devices. Metadata identifying module 505 may determine a type or category for the metadata based on certain criteria. In some embodiments, metadata identifying module 505 may select among a plurality of metadata for a limited type or category of metadata based on the criteria. Metadata identifying module 505 may apply an identifier to the metadata. In other embodiments, metadata identifying module 505 may operate at least in part to create metadata, or at least certain types of metadata (e.g., for preexisting metadata).

Metadata grouping module 510 may operate to collect, gather or otherwise group together certain metadata (e.g., metadata identified by metadata identifying module 505). The groupings may be based on any number of different criteria such as, for example, when the metadata was generated, the type of data files to which the metadata relates or is associated with, a geographic location, an associated remote storage device to which the metadata relates and/or where the data files are stored, and the like. Metadata grouping module 510 may group the metadata into packs or pages, as described above. In some embodiments, each page may have a size limit as defined by an aggregate amount of metadata or a number of metadata units (e.g., inodes). Metadata grouping module 510 may assign an identifier to each metadata page. Metadata grouping module 510 may operate to generate, update, modify, store, and otherwise manage a plurality of metadata pages. The number of pages for a given distributed filesystem may be in the range of one to dozens, hundreds or thousands of pages.

Metadata mapping module 515 may operate to map the metadata and metadata pages. In some examples, metadata mapping module 515 may map the metadata and metadata pages based on the identifiers previously assigned to each metadata and metadata page. In other arrangements, metadata mapping module 515 may assign the identifiers to the metadata and/or metadata pages. Metadata mapping module 515 may operate to generate a manifest that represents the mapping. The manifest may be referred to as a metadata manifest. The manifest may be structured and/or stored as a page, and may be referred to as a manifest page. The manifest may be divided into a plurality of manifest pages based on the size of the mapping or other considerations such as, for example, lookup speeds, reliability issues, a storage location for the manifest pages, and the like.

Page storage module 520 may operate to store the metadata pages and/or the manifest pages. Page storage module 520 may store the pages at various locations including, for example, central server 110, remote storage devices 105, or in some other way store within a distributed filesystem. Page storage module 520 may operate to add or delete metadata pages and/or manifest pages as data files and/or remote storage devices are added to or taken away from the distributed network and/or filesystem.

Figure 6:
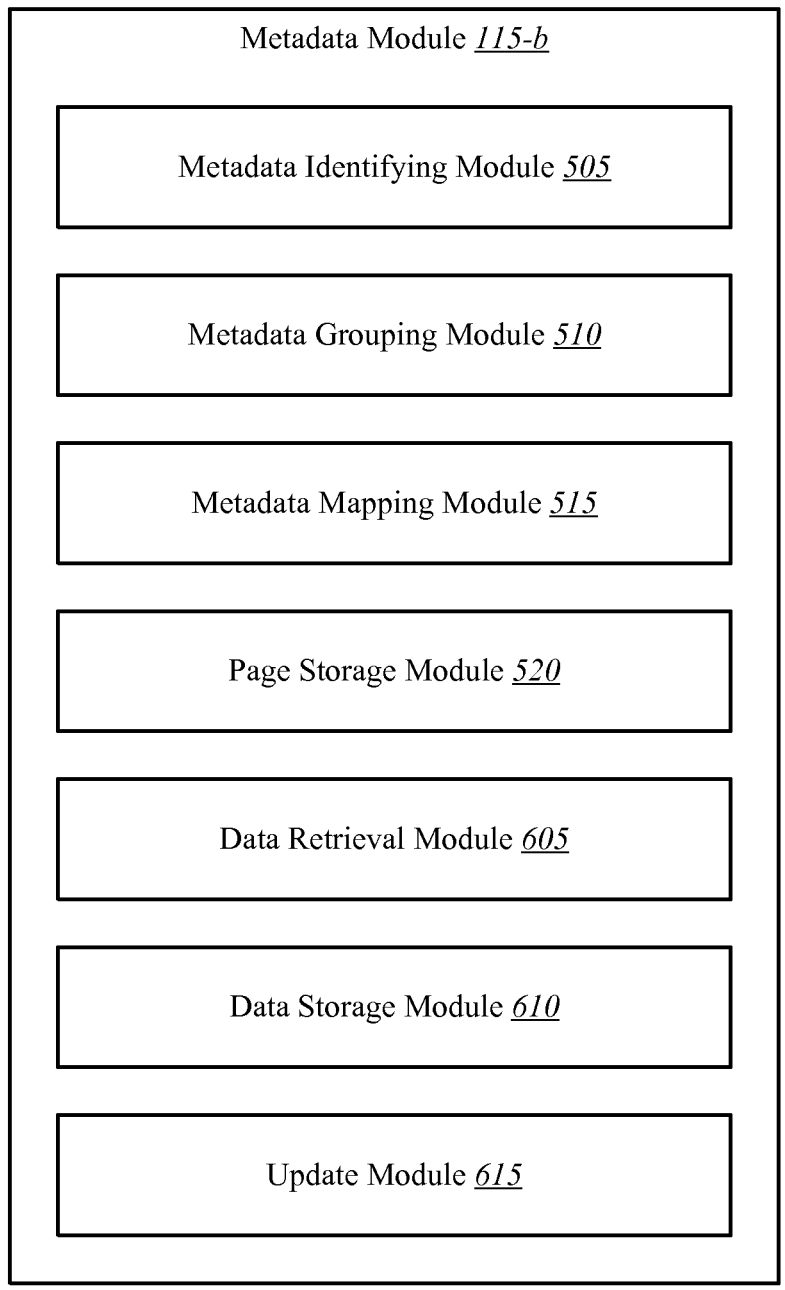
FIG. 6 is a block diagram of a metadata module of at least one of the environments shown in FIGS. 1-4.

FIG. 6 is a block diagram illustrating another example metadata module 115-*b*. Metadata module 115-*b* may be one example of the metadata module 115 described above with reference to FIGS. 1-4. Metadata module 115-*b* may include a data retrieval module 605, a data storage module 610, and an update module 615 in addition to or in place of metadata identifying module 505, metadata grouping module 510, metadata mapping module 515, and page storage module 520. In other examples, metadata module 115-*b* may include more or fewer modules than those shown in FIG. 6.

Data retrieval module 605 may operate to retrieve data from the distributed network and/or filesystem. The data retrieval module 605 may conduct a lookup function for metadata as part of retrieving the data. The lookup function may include referencing one of the metadata pages directly, or first referencing the manifest page followed by referencing one of the metadata pages and ultimately obtaining access to the metadata needed for the data file lookup. Data retrieval module 605 may use the metadata identifiers and metadata page identifiers as part of conducting the lookup function for the metadata.

Data storage module 610 may operate to store additional data files in the distributed filesystem. At least a portion of the functionality of data storage module 610 may include creating additional metadata associated with the data file, storing the metadata on an existing metadata page and/or forming a new metadata page for the metadata, and updating the manifest page or creating additional manifest pages with identifiers to the newly formed metadata and/or metadata pages. Data storage module 610 may operate to store the file data at any of a number of locations including, for example, any one of the remote storage devices. Data storage module 610 may create backup copies of the file data within the distributed filesystem. In some embodiments, data storage module 610 or metadata module 115 generally, may operate to create redundant copies of the metadata, metadata pages, and/or manifest pages.

Update module 615 may operate alone or in conjunction with data retrieval module 605 and/or data storage module 610 to update metadata pages and/or the manifest pages as data files are added to or removed from the distributed filesystem (e.g., when remote storage devices 105 are added to or removed from the distributed filesystem). Update module 615 may operate, for example, to add metadata, add metadata pages, add manifest pages, or remove any metadata, metadata pages or manifest pages needed in order to update the filesystem. Update module 615 may also operate to add or remove redundant copies of data files, metadata, metadata pages, and/or manifest pages as part of updating.

Figure 7:
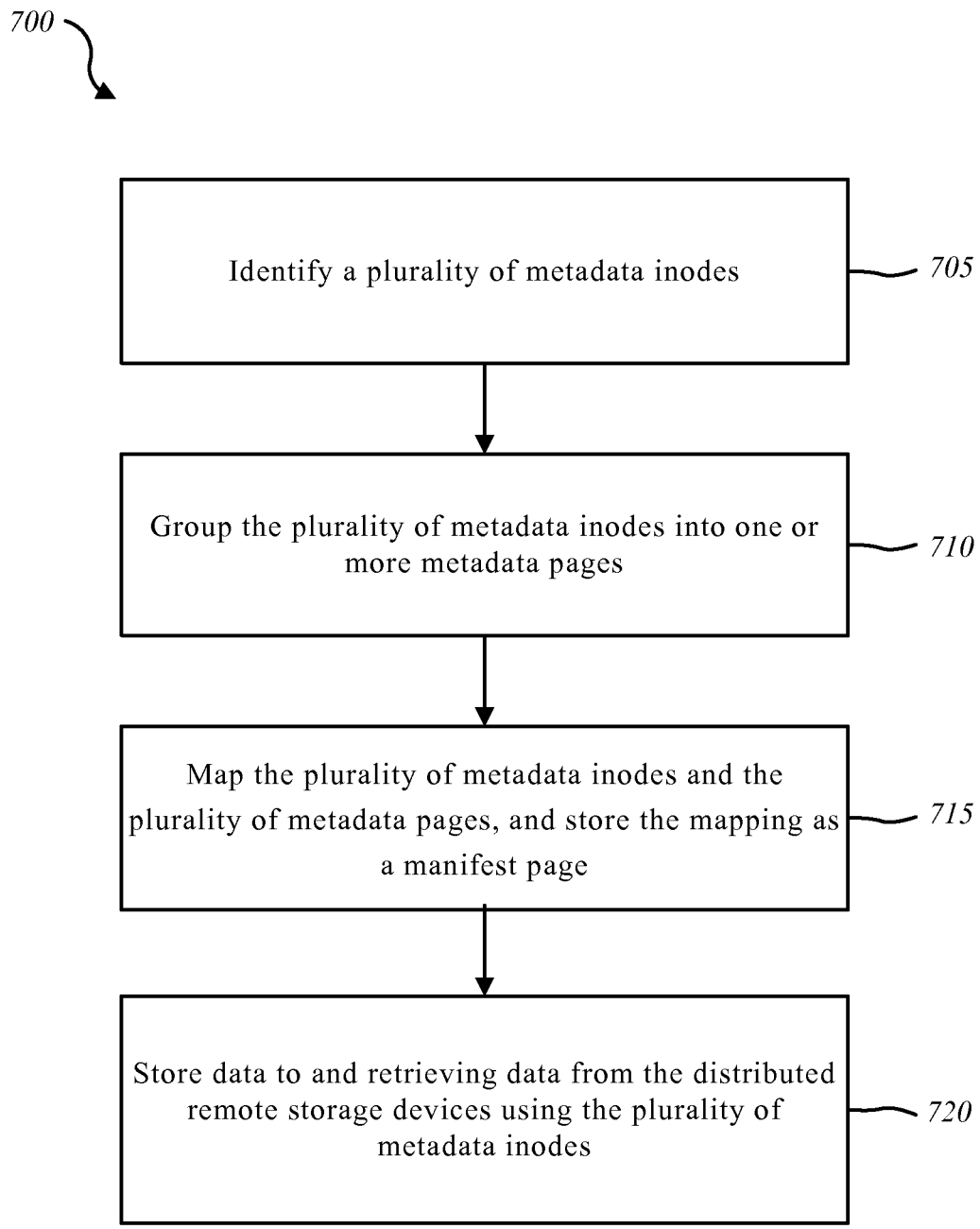
FIG. 7 is a flow diagram illustrating a method for storing metadata in a network of distributed remote storage devices.

FIG. 7 is a block diagram illustrating one embodiment of a method 700 for storing metadata in a network of distributed remote storage devices. In some configurations, the method 700 may be implemented by the metadata module 115 shown and described to reference FIGS. 1-6. In other examples, method 700 may be performed generally by remote storage devices 105 and/or central server 110 shown in FIGS. 1-4, or even more generally by the environments 100, 200, 300, 400 shown in FIGS. 1-4.

At block 705, method 700 includes identifying a plurality of metadata inodes. Block 710 includes grouping a plurality of metadata inodes into one or more metadata pages. Block 715 includes mapping the plurality of metadata inodes and the plurality of metadata pages, and storing the map as a manifest page. Block 720 includes storing data to and retrieving data from the distributed remote storage devices using the plurality of metadata inodes.

Retrieving data from the distributed remote storage devices according to method 700 may include referencing the manifest page for a location of at least one of the metadata inodes, and then accessing the at least one of the metadata inodes based on the location. The metadata inodes may include at least one of a directory inode, a file inode, and a symlink inode. The plurality of metadata inodes may include inode identifiers, and the one or more metadata pages may include page identifiers, wherein the inode and page identifiers may be used for mapping. Method 700 may include creating additional metadata pages when distributed remote storage devices are added to the network. Method 700 may include revising or removing one or more of the metadata pages when at least one of the distributed remote storage devices is removed from the network. The method 700 may include storing the metadata pages and the manifest page in a filesystem for the network. Grouping the plurality of metadata inodes may be based on at least one criteria. The at least one criteria may include a type of metadata inode.

Figure 8:
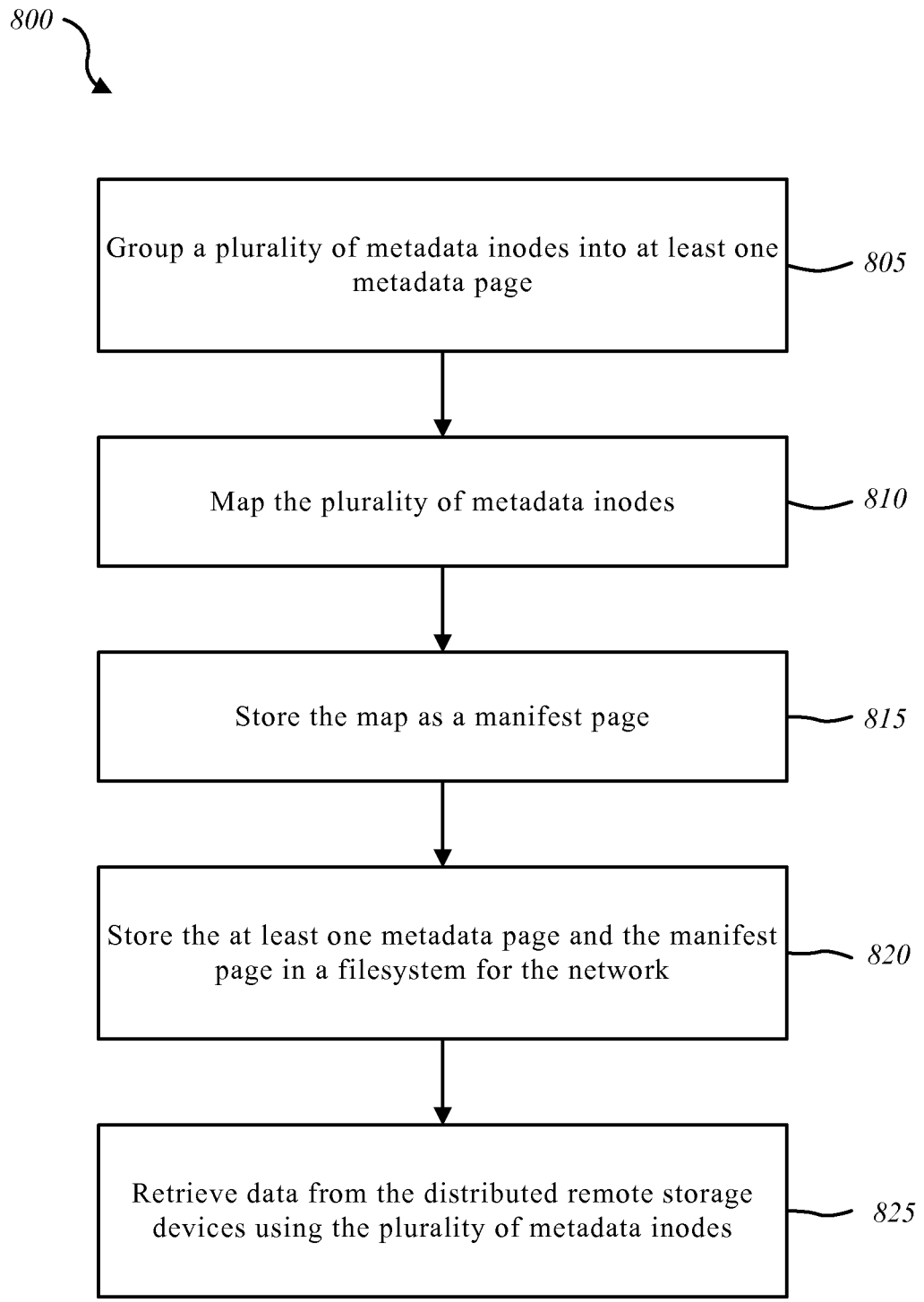
FIG. 8 is a flow diagram illustrating another method for storing metadata in a network of distributed remote storage devices.

FIG. 8 is a block diagram illustrating one embodiment of a method 800 for storing metadata in a network of distributed remote storage devices. In some configurations, the method 800 may be implemented by the metadata module 115 shown and described with reference to FIGS. 1-6. In one example, method 800 may be performed generally by remote storage devices 105 and/or central server 110 shown in FIGS. 1-4, or even more generally by the environments 100, 200, 300, 400 shown in FIGS. 1-4.

At block 805, the method 800 includes grouping a plurality of metadata inodes into at least one metadata page. Block 810 includes mapping the plurality of metadata inodes. Block 815 includes storing the mapping as a manifest page. Block 820 includes storing the at least one metadata page and the manifest page in a filesystem for the network. Block 825 includes retrieving data from the distributed remote storage device using the plurality of metadata inodes.

Method 800 may include adding data to the distributed remote storage devices using the plurality of additional metadata inodes. Method 800 may include updating the manifest to include mapping of the additional metadata inodes. Method 800 may include storing multiple copies of the metadata inodes in the filesystem. Method 800 may include assigning a metadata inode identifier to each metadata inode, assigning a metadata page identifier to each metadata page, and retrieving metadata using the metadata inode identifier and the metadata page identifier to locate the data.

Figure 9:
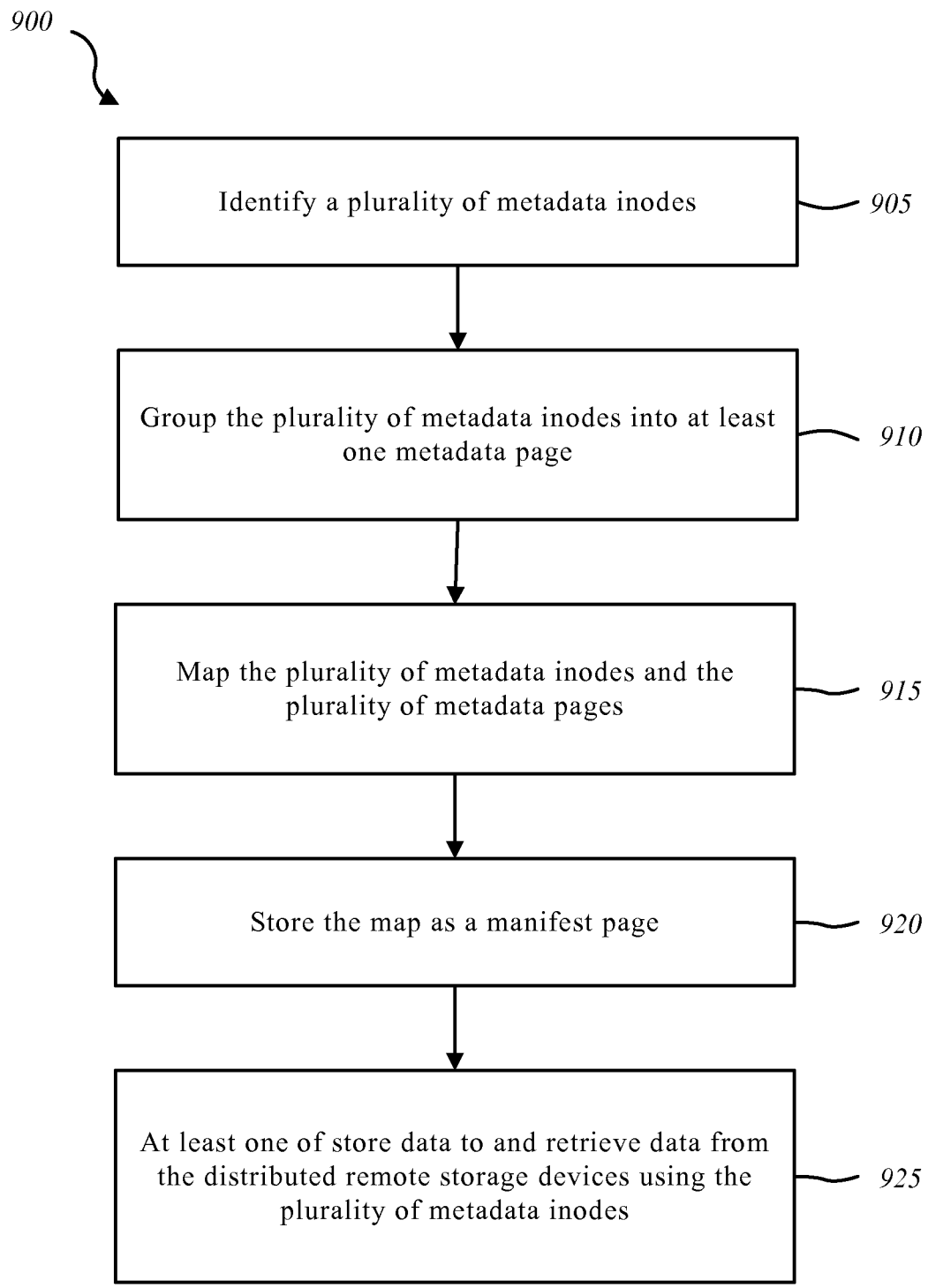
FIG. 9 is a flow diagram illustrating another method for storing metadata in a network of distributed remote storage devices.

FIG. 9 is a block diagram illustrating one embodiment of a method 900 for storing metadata in a network of distributed remote storage devices. The method 900, in some configurations, may be implemented by the metadata module 115 shown and described with reference to FIGS. 1-6. In one example, method 900 may be performed generally by a remote storage device 105 and/or central server 110 shown in FIGS. 1-4, or even more generally by the environments 100, 200, 300, 400 shown in FIGS. 1-4.

At block 905, the method 900 includes identifying a plurality of metadata inodes. Block 910 includes grouping the plurality of metadata inodes into at least one metadata page. Block 915 includes mapping the plurality of metadata inodes and the plurality of metadata pages. Block 920 includes storing the mapping as a manifest page. Block 925 includes at least one of storing data to and retrieving data from the distributed remote storage devices using the plurality of metadata inodes.

Method 900 may also include storing the at least one metadata page and manifest page in a filesystem for the network. Method 900 may include dividing the manifest page into a plurality of manifest pages. Method 900 may include assigning a page identifier to each metadata page, and assigning a metadata identifier to each metadata inode. The metadata may include at least one structured data with information about other inode objects, names of the inode objects, and cryptographic information.

Figure 10:
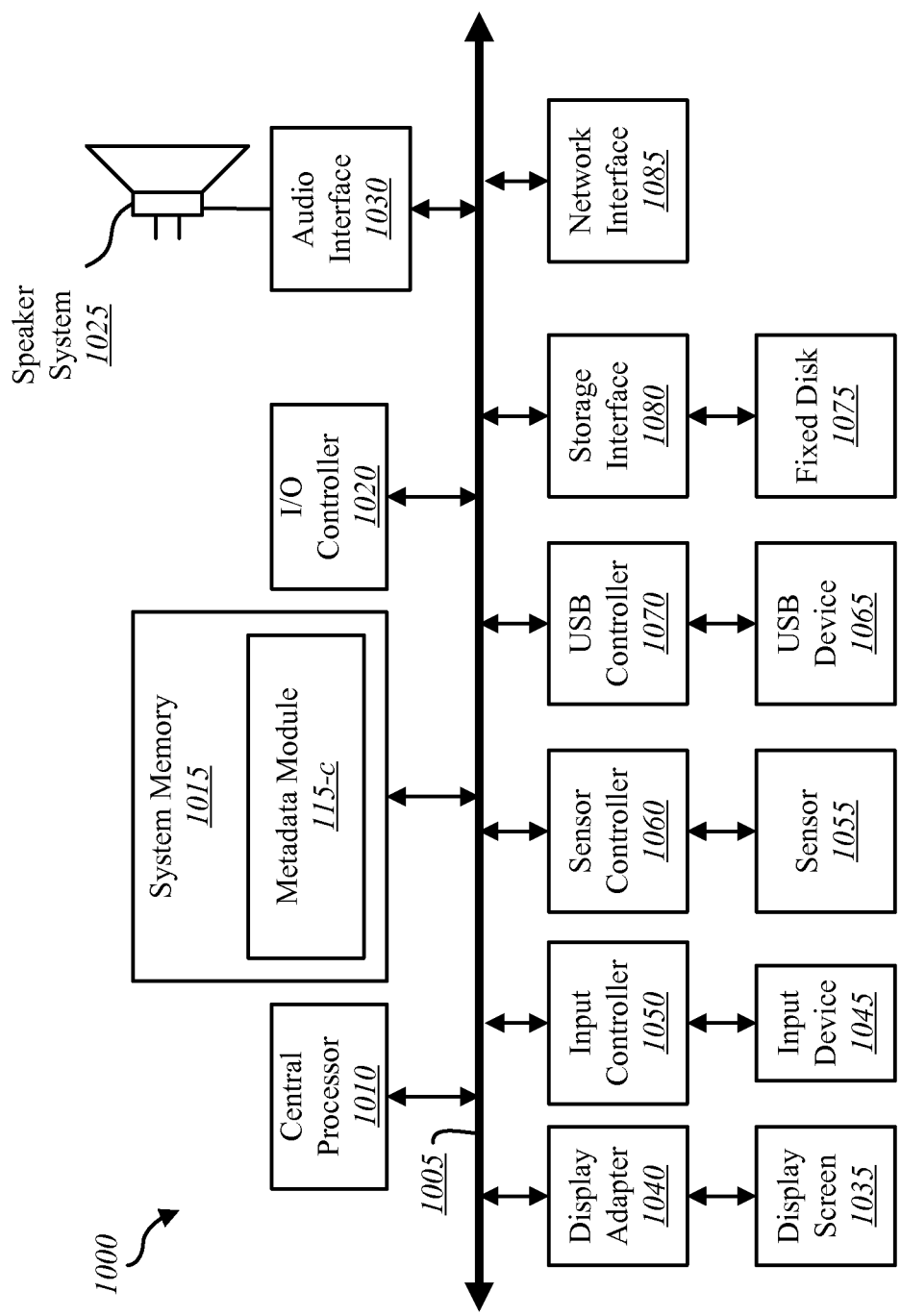
FIG. 10 is a block diagram of a computer system suitable for implementing the present systems and methods of FIGS. 1-9.

FIG. 10 depicts a block diagram of a controller 1000 suitable for implementing the present systems and methods. In one configuration, controller 1000 includes a bus 1005 which interconnects major subsystems of controller 1000, such as a central processor 1010, a system memory 1015 (typically RAM, but which may also include ROM, flash RAM, or the like), an input/output controller 1020, an external audio device, such as a speaker system 1025 via an audio output interface 1030, an external device, such as a display screen 1035 via display adapter 1040, an input device 1045 (e.g., remote control device interfaced with an input controller 1050), multiple USB devices 1065 (interfaced with a USB controller 1070), and a storage interface 1080. Also included are at least one sensor 1055 connected to bus 1005 through a sensor controller 1060 and a network interface 1085 (coupled directly to bus 1005).

Bus 1005 allows data communication between central processor 1010 and system memory 1015, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the metadata module 115-*c* to implement the present systems and methods may be stored within the system memory 1015. Applications resident with controller 1000 are generally stored on and accessed via a non-transitory computer readable medium, such as a hard disk drive (e.g., fixed disk drive 1075) or other storage medium. Additionally, applications can be in the form of electronic signals modulated in accordance with the application and data communication technology when accessed via network interface 1085.

Storage interface 1080, as with the other storage interfaces of controller 1000, can connect to a standard computer readable medium for storage and/or retrieval of information, such as a fixed disk drive 1075. Fixed disk drive 1075 may be a part of controller 1000 or may be separate and accessed through other interface systems. Network interface 1085 may provide a direct connection to a remote server via a direct network link to the Internet via a POP (point of presence). Network interface 1085 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1000 wirelessly via network interface 1085.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 10 need not be present to practice the present systems and methods. The devices and subsystems can be interconnected in different ways from that shown in FIG. 10. The aspect of some operations of a system such as that shown in FIG. 10 are readily known in the art and are not discussed in detail in this application. Code to implement the present disclosure can be stored in a non-transitory computer-readable medium such as one or more of system memory 1015 or fixed disk drive 1075. The operating system provided on controller 1000 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A computer implemented method for storing metadata in a network of distributed remote storage devices, comprising:
   identifying a plurality of metadata inodes and assigning an associated inode identifier to each of the plurality of metadata inodes;
   grouping the plurality of metadata inodes into one or more metadata pages and assigning an associated page identifier to each of the one or more metadata pages;
   mapping the plurality of metadata inodes and the one or more metadata pages, and storing the mapping as a manifest page, wherein the manifest page comprises a mapping from each of the plurality of inode identifiers to each of the one or more page identifiers; and
   storing data to the distributed remote storage devices using the plurality of metadata inodes; and
   retrieving data from the distributed remote storage devices using a lookup function associated with the plurality of metadata inodes, the lookup function comprising referencing the manifest page, obtaining information associated with the manifest page and the plurality of metadata inodes based at least in part on an inode identifier and a page identifier, and conducting a search by obtaining the metadata page and the metadata inode.

2. The method of claim 1, wherein retrieving data from the distributed remote storage devices includes referencing the manifest page for a location of at least one of the metadata inodes, and then accessing the at least one of the metadata inodes based on the location.

3. The method of claim 1, wherein the metadata inodes include at least one of a directory inode, a file inode, and a symlink inode.

4. The method of claim 1, further comprising:
   creating additional metadata pages when additional distributed remote storage devices are added to the network.

5. The method of claim 1, further comprising:
   revising or removing one or more of the metadata pages when at least one of the distributed remote storage devices is removed from the network.

6. The method of claim 1, further comprising:
   storing the metadata pages and the manifest page in a filesystem for the network.

7. The method of claim 1, wherein grouping the plurality of metadata inodes is based on at least one criteria.

8. The method of claim 7, wherein the at least one criteria includes a type of metadata inode.

9. The method of claim 1, wherein grouping the plurality of metadata inodes into one or more metadata pages further comprises:

grouping two or more of the plurality of metadata inodes into a single metadata page.

10. A computer-program product for storing metadata in a network of distributed remote storage devices, the computer-program product comprising a non-transitory computer-readable medium storing instructions executable by a processor to:

identify a plurality of metadata inodes and assign an associated inode identifier to each of the plurality of metadata inodes;

group the plurality of metadata inodes into at least one metadata page and assign an associated page identifier to each of the at least one metadata page;

map the plurality of metadata inodes and the at least one at least one metadata page;

store the map as a manifest page, wherein the manifest page comprises a mapping from each of the plurality of inode identifiers to each of the at least one page identifiers;

store the at least one metadata page and the manifest page in a filesystem for the network; and retrieve data from the distributed remote storage devices using a lookup function associated with the plurality of metadata inodes, the lookup function comprising referencing the manifest page, obtaining information associated with the manifest page and the plurality of metadata inodes based at least in part on an inode identifier and a page identifier, and conducting a search by obtaining the metadata page and the metadata inode.

11. The computer-program product of claim 10, wherein the instructions are executable by the processor to:

receive additional metadata inodes for at least one additional distributed remote storage device added to the network; and add the additional metadata inodes to one of the at least one metadata page or create at least one additional metadata page for the additional metadata inodes.

12. The computer-program product of claim 11, wherein the instructions are executable by the processor to:

add data to the distributed remote storage devices using the plurality of additional metadata inodes.

13. The computer-program product of claim 11, wherein the instructions are executable by the processor to:

update the manifest page to include mapping of the additional metadata inodes.

14. The computer-program product of claim 10, wherein the instructions are executable by the processor to:

store multiple copies of the metadata inodes in the filesystem.

15. The computer-program product of claim 10, wherein the instructions are executable by the processor to:

group two or more of the plurality of metadata inodes into a single metadata page.

16. An apparatus for storing metadata in a network of distributed remote storage devices, comprising:

a processor;

a memory in electronic communication with the processor; and instructions stored in the memory, the instructions being executable by the processor to:

identify a plurality of metadata inodes and assign an associated inode identifier to each of the plurality of metadata inodes;

group the plurality of metadata inodes into at least one metadata page and assign an associated page identifier to each of the at least one metadata page;

map the plurality of metadata inodes and the at least one metadata page;

store the map as a manifest page, wherein the manifest page comprises a mapping from each of the plurality of inode identifiers to each of the at least one page identifiers;

store data to the distributed remote storage devices using the plurality of metadata inodes; and retrieve data from the distributed remote storage devices using a lookup function associated with the plurality of metadata inodes, the lookup function comprising referencing the manifest page, obtaining information associated with the manifest page and the plurality of metadata inodes based at least in part on an inode identifier and a page identifier, and conducting a search by obtaining the metadata page and the metadata inode.

17. The apparatus of claim 16, wherein the instructions are executable by the processor to:

store the at least one metadata page and the manifest page in a filesystem for the network.

18. The apparatus of claim 16, wherein the instructions are executable by the processor to:

divide the manifest page into a plurality of manifest pages.

19. The apparatus of claim 16, wherein the metadata includes at least one structure data with information about other inode objects, names of the inode objects, and cryptographic information.

20. The apparatus of claim 16, wherein the instructions are executable by the processor to:

group two or more of the plurality of metadata inodes into a single metadata page.

* * * * *